May 30, 1944.  A. L. PARKER  2,350,065
METAL WORKING MACHINE
Filed March 31, 1941  2 Sheets-Sheet 1
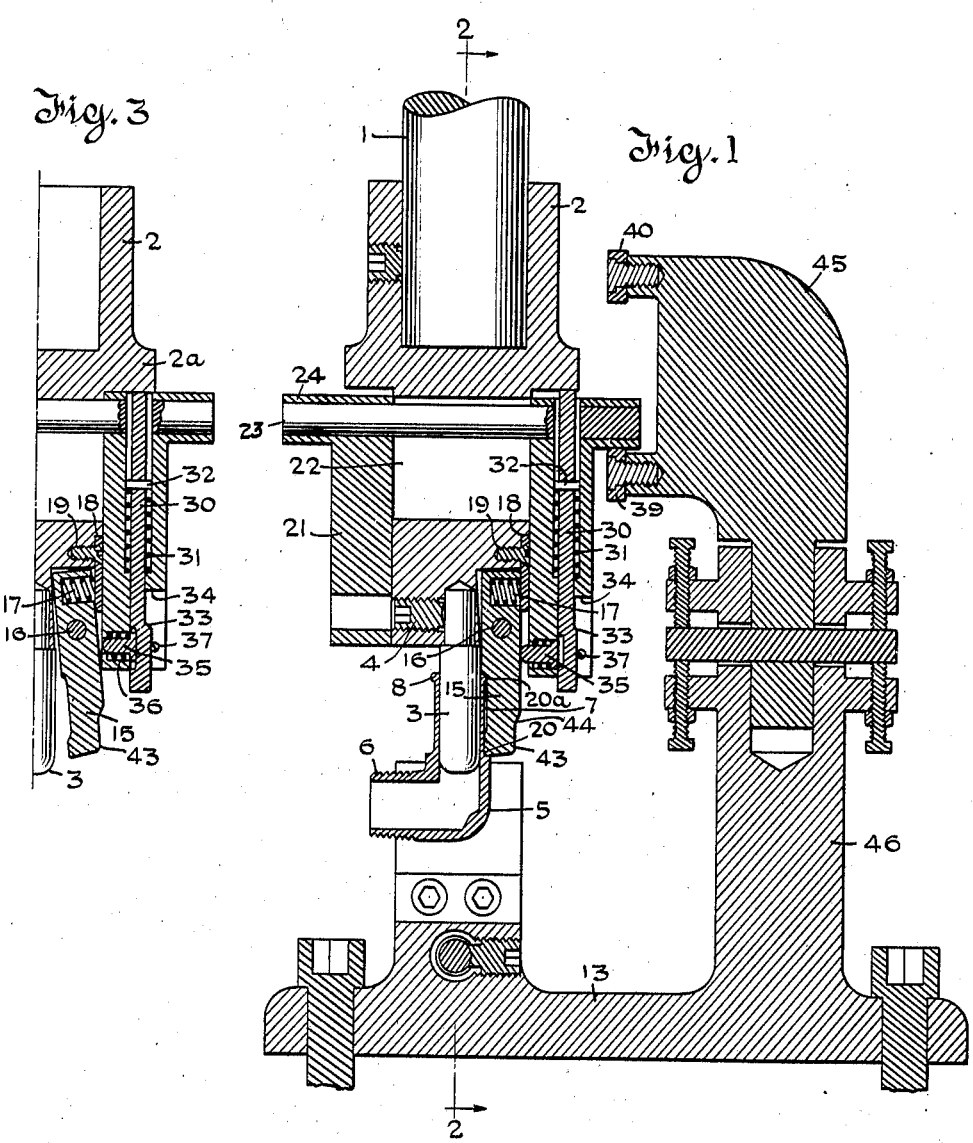
Inventor
Arthur L. Parker
By
Mason & Porter
Attorneys May 30, 1944.    A. L. PARKER    2,350,065
METAL WORKING MACHINE
Filed March 31, 1941    2 Sheets-Sheet 2
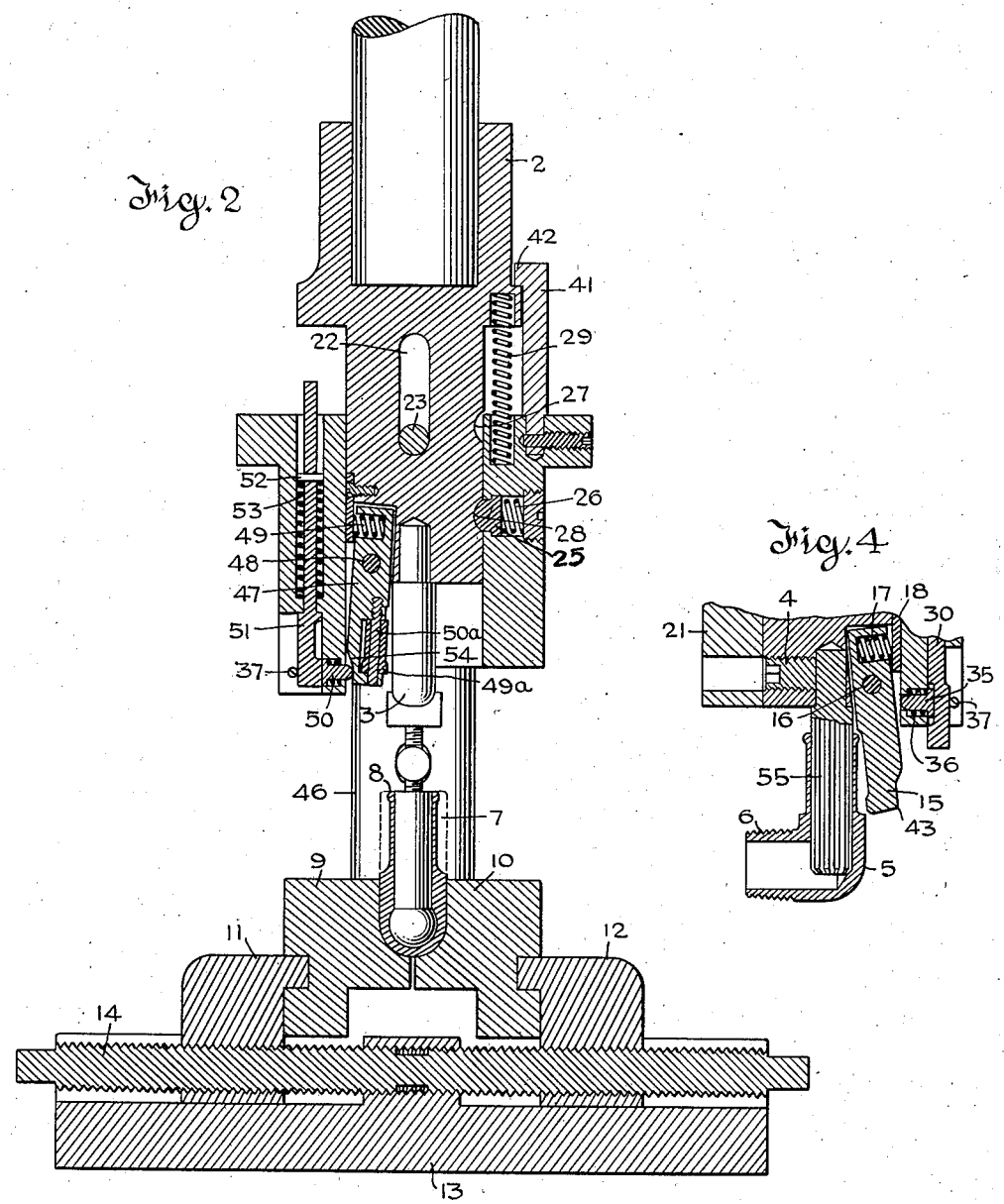
Inventor
Arthur L. Parker
By
Mason & Porter
Attorneys Patented May 30, 1944

2,350,065

UNITED STATES PATENT OFFICE 2,350,065

METALWORKING MACHINE

Arthur L. Parker, Cleveland, Ohio, assignor to The Parker Appliance Company, Cleveland, Ohio, a corporation of Ohio Application March 31, 1941, Serial No. 386,218

8 Claims. (Cl. 82—19)

The invention relates to a new and useful improvement in a metal working machine for shaping the outer surface of a sleeve projecting from a metal part.

An object of the invention is to provide a cutting tool for the shaping of the outer surface of the sleeve and a controlled means therefore operating to position the tool for cutting the sleeve so as to leave a projecting beaded portion at the outer end thereof.

A further object of the invention is to provide a machine of the above type wherein the tool rotates bodily about the longitudinal axis of the sleeve during the cutting thereof.

A still further object of the invention is to provide a machine of the above type wherein work rests are mounted for rotation with the cutting tool so as to support the sleeve during the cutting thereof.

A still further object of the invention is to provide a machine of the above type wherein a mandrel carried by the rotating part supporting the tool extends into the sleeve for supporting and aligning the same with the axis of rotation of the tool during the cutting of the sleeve.

In the drawings:

Figure 1 is a vertical sectional view through a portion of a metal working machine embodying the improvements, said section being taken through the cutting tool.

Figure 2 is a sectional view on the line 2—2 of Figure 1.

Figure 3 is a detail in vertical section showing the cutting head raised and the cutting tool retracted.

Figure 4 is a vertical sectional view through a cutting tool and a portion of the head supporting the same but showing a modified form of the invention.

In carrying out the invention, the cutting tool is mounted for operation on a head which is attached to the lower end of a spindle of a drill press or the like which spindle is rotated and also move endwise during its rotation. The drill press as a whole has not been shown in the drawings but only the novel parts which embody the invention. The lower end of the drill spindle is shown at 1. Attached to this spindle is a tool carrying head 2 which is secured thereto in any suitable way. This tool supporting head carries a mandrel 3 which is located in the axis of rotation of the spindle. The mandrel is secured to the head by means of a clamping bolt 4. The metal part to be operated upon as shown in the drawings is an elbow coupling indicated at 5.

Said elbow coupling has a threaded portion 6 and a projecting sleeve 7, which is initially shaped as indicated in the dotted lines in Figure 2. The machine is particularly adapted for the shaping of the projecting sleeve. In Fgure 1 of the drawings, the sleeve is shown in its finished form. Said sleeve is cut away so as to form a relatively thin wall with an outwardly projecting bead 8 at the outer end thereof. This coupling sleeve is firmly clamped in a work support which includes clamping jaws 9 and 10. These clamping jaws are carried respectively by brackets 11 and 12, mounted for sliding movement in the base portion 13 of the attachment. This base portion 13 is adapted to be attached to the supporting base of the drill press.

The brackets 11 and 12 are moved toward and from each other for clamping the work by a shaft 14 which has right and left hand threads engaging the brackets 11 and 12, respectively. This shaft is held from endwise movement and when turned it will move the brackets so as to clamp the work centrally beneath the rotating spindle.

The supporting head 2 is recessed at one side thereof and mounted in said recess is a cutting tool 15. Said cutting tool 15 is mounted on a pivot pin 16 which extends through the adjacent walls of the supporting head 2. A spring 17 is mounted in a recess in the tool above the pivot pin 16. This spring at its outer end bears against a plate 18 secured to the supporting head 2 by a screw 19. The cutting tool 15 is provided with a rounded cutting face 20 at the lower end thereof.

Mounted on the supporting head 2 is a control sleeve 21. The supporting head 2 has a slot 22 therein, which slot is elongated as shown in Figure 2. A rod 23 extends through the slot in the head and through the sleeve. The upper end of the sleeve is provided with a laterally projecting flange 24 and the rod extends outwardly in the flange to the outer end thereof. This control sleeve 21 rotates with the head 2 but has a limited endwise movement thereon. The rod 23 is for the purpose of rotating the sleeve with the head and at the same time permits the sleeve to move longitudinally on the head. As shown in Figure 2, the control sleeve is provided with a spring pressed dog 25. The spring is indicated at 26. The tool supporting head 2 has spaced recesses 27 and 28. When the sleeve is in its lowered position, this dog 25 engages the recess 28 and yieldingly holds the sleeve in this set position. When the sleeve is raised on the head or the head lowered into the sleeve, then the dog will yieldingly engage the recess 27.

A series of springs 29 will engage recesses in the upper portion of the control sleeve and also recesses in the tool supporting head 2. These springs normally urge the sleeve in a downward direction to the position shown in Figure 2.

Mounted in the control sleeve 21 for vertical reciprocation is a cam control bar 30. Said cam control bar is urged upwardly in the head by a spring 31. This spring bears against a pin 32 extending through the control bar. The cam control bar 30 is provided with a shoulder 33 which shoulder contacts with a wall 34 in the control sleeve when said bar is free to be raised to its extreme upper position. Mounted in the lower end of the control sleeve 21 is a pin 35 which is normally spring pressed outward by a spring 36. The cam control bar is backed up in its movements by a pin 37. Said cam control bar has a recess 38 in its inner face. When the parts are in the position shown in Figure 1, the cutting tool has finished the shaping of the sleeve at the lower end thereof. The cutting tool also has a cutting face 20a which contacts with the outer upper face of the bead 8 of the sleeve 7 and this shapes the upper portion of the bead 8.

As the tool finishes its cutting operation on the sleeve, the flange 24 comes into contact with a roller 39 and the tool supporting head 2 will move the cam bar 30 downward so as to bring the recess in said bar opposite the pin 35 and pin 35 will move outward as shown in Figure 3, thus releasing the cutting tool 15 so that the spring 17 will move the lower end thereof outward away from the sleeve and the cutting tool will remain in this position during the retracting of the mandrel from the sleeve. At this time, the dog 25 engages the recess 27 and holds the control sleeve 21 in its raised position. The tool supporting head moves upward thus withdrawing the mandrel from the sleeve so that the sleeve may be unclamped and removed from the machine. On this upward movement of the spindle, the projecting flange 24 of the control sleeve will contact with a roller 40 and this will force the dog 25 out of the recess 27 and the springs 29 will move the control sleeve downward on the tool supporting head 2. This downward movement of the control sleeve on the tool supporting head is limited by the dog's 25 dropping into recess 28 and also by holding dogs 41 carried by the sleeve which dogs have inwardly projecting parts 42 adapted to engage a shoulder on the tool supporting head 2. During this downward movement of the control sleeve through the action of the springs 29, the cam bar 30 is released from its engagement with the shoulder 2a on the tool supporting head and said bar will move upward in the control sleeve causing the pin 35 to project outward against the face 43 of the cutting tool. The cutting tool is still retracted a sufficient distance away from the mandrel so that the mandrel may be moved down into a new work piece for the forming of another sleeve. When the cutting tool is well below the upper edge of the sleeve so that by an inward movement of the same the lower part of the bead 8 can be shaped, the flange 24 of the sleeve contacts with the roller 39 and further downward movement of the sleeve ceases. The continued downward movement of the work supporting head will cause the pin 35 to engage the cam face 44 of the tool and force said tool gradually inwardly, thus cutting into the sleeve to the full depth desired. This finishes the under side of the bead and a further downward movement of the rotating head will cut away the sleeve giving the proper shape thereto shown in full lines in the drawings. The tool will be held in engagement wit hthe work with the pin 35 contacting with the outer face thereof, which pin is held from movement by the cam bar until the bar is lowered so as to bring the recess therein opposite the pin.

The rollers 39 and 40 are mounted on a bracket 45 which bracket is carried by a standard 46 formed as a part of the supporting base 13. This bracket 45 can be raised and lowered in the standard 46 by a suitable adjusting means.

Mounted on the tool supporting head 2 are two work rests or supports one of which is shown in Figure 2. These work rests or supports are disposed substantially at 120° from the cutting tool and they serve to support the work against the cutting pressure of the tool as it is held in cutting engagement with the sleeve. These work rests or supports are similar in construction and only one will be described.

The work rest is in the form of a lever 47 mounted on a pivot pin 48. The lower end of the lever is cut away to receive a roller 49a, mounted on a pin 50a. This roller is moved into contact with the work in the same manner that the cutting tool is moved into contact with the work. There is a spring 49 which engages the lever 47 above the pivot pin 48. There is also a spring pressed pin 50 which is controlled by a cam bar 51. This cam bar carries a pin 52 and a spring 53 normally raises the cam bar to the position shown in Figure 2. When the control sleeve engages the roller 39, then the control pins 50 will be moved into contact with the cam face 54 and force the rollers into contact with the work in the region where the cutting tool has cut away the sleeve. In other words, this roller is shaped so as to follow the shaping of the sleeve as it is cut by the rotating cutting tool. The pin contacting with lever 47 will hold the roller firmly against the work thus supporting it in the manner described above.

In Figure 4 of the drawings, there is shown a slightly modified form of the invention. In the place of the mandrel 3 there is a reaming tool 55; said reaming tool enters the sleeve and reams or cuts the inner surface of the sleeve thus accurately shaping the sleeve on the inside while the cutting tool is shaping the sleeve on the outside. The cutting tool in this form of the invention is precisely the same in construction and operation as that described above in detail.

It is obvious that many changes may be made in the details of construction without department from the spirit of the invention as set forth in the appended claims.

I claim:

1. A metal working machine comprising a rotating and reciprocating spindle, a work clamp for fixedly supporting a work piece in axial alignment with the spindle, a tool supporting head fixed to said spindle, a cutting tool eccentrically mounted on said head so as to be moved radially thereof, spring means for normally moving said cutting tool outward, means for moving the cutting tool inward during the downward movement of the spindle for positioning the same so as to shape the outer face of the work piece to provide a portion at the upper end thereof of one diameter and a portion below said end of a uniform smaller diameter, and means operated by the downward movement of the spindle for releasing the means which moves the cutting tool inward for permitting the spring to move the tool outward from contact with the work during the upward movement of the spindle.

2. A metal working machine comprising a rotating and reciprocating spindle, a work clamp for fixedly supporting a work piece in axial alignment with the spindle, a tool supporting head fixed to said spindle, a cutting tool eccentrically mounted on said head so as to be moved radially thereof, spring means for normally moving said cutting tool outward, means for moving the cutting tool inward during the downward movement of the spindle for positioning the same so as to shape the outer face of the work piece to provide a portion at the upper end thereof of one diameter and a portion below said end of a uniform smaller diameter, means operated by the downward movement of the spindle for releasing the means which moves the cutting tool inward for permitting the spring to move the tool outward from contact with the work during the upward movement of the spindle, a work rest mounted on said head, and mechanism for moving the work rest into engagement with the work at the side opposite the cutting tool during the downward movement of the spindle and for automatically moving said work rest outward from contact with the work during the upward movement of the spindle.

3. A metal working machine comprising a rotating and reciprocating spindle, a work clamp for fixedly supporting a work piece in axial alignment with the spindle, a tool supporting head fixed to said spindle, a mandrel mounted on said head and adapted to move into said work piece for supporting the same during the cutting and shaping of the outer face thereof, a cutting tool eccentrically mounted on said head so as to be moved radially thereof, spring means for normally moving said cutting tool outward, means for moving the cutting tool inward during the downward movement of the spindle for positioning the same so as to shape the outer face of the work piece to provide a portion at the upper end thereof of one diameter and a portion below said end of a uniform smaller diameter, and means operated by the downward movement of the spindle for releasing the means which moves the cutting tool inward for permitting the spring to move the tool outward from contact with the work during the upward movement of the spindle.

4. A metal working machine comprising a rotating and reciprocating spindle, a work clamp for fixedly supporting a work piece in axial alignment with the spindle, a tool supporting head fixed to said spindle, a mandrel mounted on said head and adapted to move into said work piece for supporting the same during the cutting and shaping of the outer face thereof, a cutting tool eccentrically mounted on said head so as to be moved radially thereof, spring means for normally moving said cutting tool outward, means for moving the cutting tool inward during the downward movement of the spindle for positioning the same so as to shape the outer face of the work piece to provide a portion at the upper end thereof of one diameter and a portion below said end of a uniform smaller diameter, means operated by the downward movement of the spindle for releasing the means which moves the cutting tool inward for permitting the spring to move the tool outward from contact with the work during the upward movement of the spindle, a work rest mounted on said head, and mechanism for moving the work rest into engagement with the work at the side opposite the cutting tool during the downward movement of the spindle and for automatically moving said work rest outward from contact with the work during the upward movement of the spindle.

5. A metal working machine comprising a rotating and reciprocating spindle, a work clamp for fixedly supporting a work piece in axial alignment with the spindle, a tool supporting head fixed to said spindle, a lever pivotally mounted on said head for movement in a plane radial of the head, a cutting tool at the lower end of said lever, a spring operating on said lever for moving the cutting tool outward, a cam bar, and a pin controlled by said cam bar and adapted to engage the lever during the downward movement of the head for shifting the lever inward to a cutting position on the work, said cam bar including means for releasing the pin when the spindle reaches the lower end of the reciprocation of the spindle so that the spring will move the cutting tool outward from contact with the material during the upward movement of the spindle.

6. A metal working machine comprising a rotating and reciprocating spindle, a work clamp for fixedly supporting a work piece in axial alignment with the spindle, a tool supporting head fixed to said spindle, a lever pivotally mounted on said head for movement in a plane radial of the head, a cutting tool at the lower end of the lever, a spring operating on said lever for moving the tool outward, a sleeve mounted on said head and shiftable from one set position to another on said head, a pin carried by said sleeve and adapted to engage said lever for moving said lever inward into engagement with the work, and a cam bar carried by said sleeve for controlling said pin, said cam bar being provided with means for releasing the pin when the head reaches the lower end of its reciprocation so that the spring will shift the lever to move the cutting tool out of engagement with the work during the upward movement of the spindle.

7. A metal working machine comprising a rotating and reciprocating spindle, a work clamp for fixedly supporting a work piece in axial alignment with the spindle, a tool supporting head fixed to said spindle, a lever pivotally mounted on said head for movement in a plane radial of the head, a cutting tool at the lower end of the lever, a spring operating on said lever for moving the tool outward, a sleeve mounted on said head and shiftable from one set position to another on said head, a pin carried by said sleeve and adapted to engage said lever for moving said lever inward into engagement with the work, said lever being shaped so that when the lever moves along said pin the cutting tool will be shifted inward to a new cutting position, and a cam bar carried by said sleeve, said cam bar being positioned so as to hold said pin rigidly projected from the sleeve during the downward movement of the spindle and having means for releasing said pin on the upward movement of the spindle, whereby the spring may move the lever so as to withdraw the cutting tool from engagement with the work during the upward movement of the spindle.

8. A metal working machine comprising a rotating and reciprocating spindle, a work clamp for fixedly supporting a work piece in axial alignment with the spindle, a tool supporting head fixed to said spindle, a lever pivotally mounted on said head for movement in a plane radial of the head, a cutting tool at the lower end of said lever, a spring operating on said lever for moving the cutting tool outward, a cam bar, and a pin controlled by said cam bar and adapted to engage the lever during the downward movement of the head for shifting the lever inward to a cutting position on the work, said cam bar including means for releasing the pin when the spindle reaches the lower end of the reciprocation of the spindle so that the spring will move the cutting tool outward from contact with the material during the upward movement of the spindle, said lever having an auxiliary cutting face adapted to engage the end of the tube for the final shaping of the bead thereon when the spindle reaches the lower end of its stroke.

ARTHUR L. PARKER.